United States Patent
Lin

(12) 
(10) Patent No.: US 6,310,453 B1
(45) Date of Patent: Oct. 30, 2001

(54) DRIVE CIRCUIT FOR A SPEED ADJUSTABLE FAN

(75) Inventor: Yu Liang Lin, Kaohsiung (TW)

(73) Assignee: Asia Vital Components Co., LTD (TW)

( * ) Notice: Subject to any disclaimer, the term of this patent is extended or adjusted under 35 U.S.C. 154(b) by 0 days.

(21) Appl. No.: 09/515,649

(22) Filed: Feb. 29, 2000

(30) Foreign Application Priority Data

Dec. 6, 1999 (TW) ............................................. 088220778

(51) Int. Cl.[7] .............................. G05B 5/00; H02H 7/08; H02P 1/00; H02P 3/00; H02P 7/00
(52) U.S. Cl. ........................... 318/445; 318/268; 318/799; 318/599; 388/907.5
(58) Field of Search .................................... 318/445, 254, 318/139, 439, 138, 268, 271, 461, 799, 720–724, 599; 388/907.5, 804, 811

(56) References Cited

U.S. PATENT DOCUMENTS

| | | | |
|---|---|---|---|
| 3,942,083 | * 3/1976 | Takahashi et al. | 318/138 |
| 4,856,078 | * 8/1989 | Konopka | 388/831 |
| 5,309,076 | * 5/1994 | Madsen et al. | 318/782 |
| 5,363,024 | * 11/1994 | Hiratsuka et al. | 318/254 |
| 5,845,045 | * 12/1998 | Jeske et al. | 388/804 |
| 5,952,798 | * 9/1999 | Jones et al. | 318/268 |
| 6,091,887 | * 7/2000 | Dieterle et al. | 388/811 |

* cited by examiner

*Primary Examiner*—Robert E. Nappi
*Assistant Examiner*—Edgardo San Martin
(74) *Attorney, Agent, or Firm*—Connolly Bove Lodge & Hutz LLP

(57) ABSTRACT

A drive circuit for a speed adjustable fan comprises a computing IC, a Hall IC, an input terminal for external signals, and a current control circuit. The drive circuit is arranged inside the fan to control the speed of the fan without the need of an external circuit. The computing IC is connected to a Hall IC and controls two transistors connecting therewith in a state of connecting and in a state of disconnecting sequentially such that two coils of the fan are alternately magnetized so as to rotate the fan. The input terminal for external signals detects the current of the external signal source and the current is regulated by the current control circuit in the process of passing through the coils to adjust the speed of the fan.

3 Claims, 4 Drawing Sheets

DRIVE CIRCUIT FOR A SPEED ADJUSTABLE FAN

BACKGROUND OF THE INVENTION

1. FIELD OF THE INVENTION

The present invention relates to a drive circuit for a speed adjustable fan, particular to a drive circuit, which is disposed in a fan to control the current passing through coils of the fan so as to adjust the speed of the fan without any other outside circuit.

2. DESCRIPTION OF RELATED ART

As shown in FIG. 1, a prior art of drive circuit for a fan comprises a 4-pin Hall sensor (IC1'), a computing IC (IC2'). It is noted that the designation of IC in the specification is an abbreviation of integrated circuit. The power source connects a third pin of the computing IC (IC2') and connects a first pin of the Hall sensor (IC1') through a resistor (R1') respectively. The second and fourth pins of the Hall sensor (IC') are connected to the fourth and fifth pins of the computing IC (IC2') respectively. The sixth pin of the computing IC (IC2') is grounded through a capacitor (C). The seventh and ninth pins of the computing IC (IC2') connect two coils (V1', V2') respectively to drive the fan. The other ends of the coils (V1', V2') are connected to the power supply through a protective diode (D'). However, once the coils and the power supply in the circuit have been fixedly connected to each other, the speed of rotation can not be changed to suit the requirements of user's system. It is a trend that the speed of a fan can be changed in accordance with the user's command. It is known that heat dissipation by way of a fan is not limited under a condition of maximum load. Moreover, the problem of noise by using the fan will generate as well even under a condition of minimum load. Therefore, to improve the prior art circuit becomes necessary in order to meet the regulations of energy and noise for the environmental protection.

In view of the drawbacks of the prior art drive circuit for a fan, the inventor has dedicated in research for improvement. After having conducting various designs, investigations and prototype productions and revision based on professional experiences of the inventor, the drive circuit for a speed adjustable fan according the present invention has been developed advantageously.

SUMMARY OF THE INVENTION

The drive circuit for a speed adjustable fan of present invention is comprised of a Hall IC, a computing IC connecting to the Hall IC, an input terminal for external signals, and a current control circuit. The computing IC controls two transistors connecting therewith in a state of connecting and in a state of disconnecting sequentially to magnetize two coils in the fan alternately such that the fan can be actuated to rotate. The input signal terminal for external signals senses an external signal source. The current control circuit to control the current passing through the coils to adjust the rotational speed of the fan.

Accordingly, a primary objective of the present invention is to provide a drive circuit for a speed adjustable fan, which is arranged in the fan to adjust and control the rotational speed of the fan.

Another objective of the present invention is to provide a drive circuit for a speed adjustable fan, with which any external separate circuit is not necessary to use additionally.

BRIEF DESCRIPTION OF DRAWINGS

The present invention can be more fully understood by reference to the following description and accompanying, in which.

DETAILED DESCRIPTION OF PREFERRED EMBODIMENTS

Figure 1:
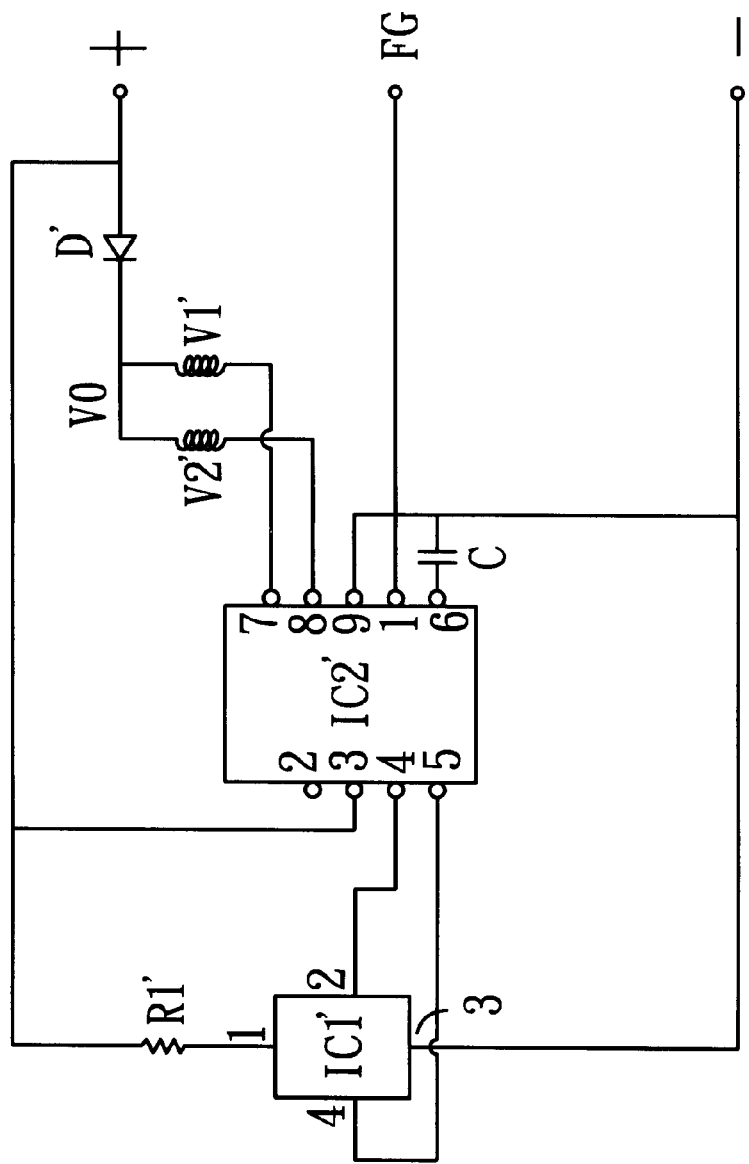
FIG. 1 is a diagram of conventional drive circuit in a fan.
Figure 2:
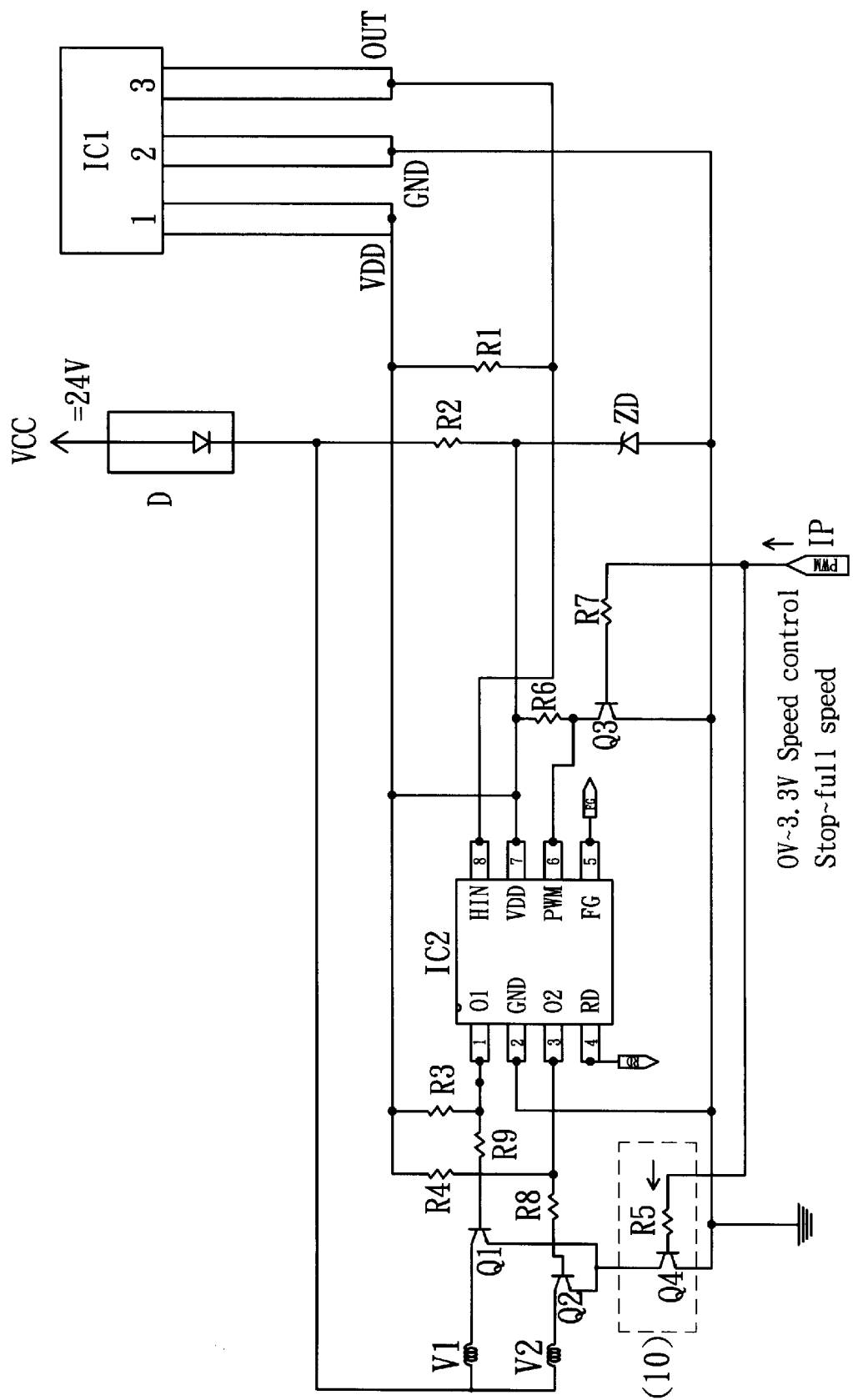
FIG. 2 is a diagram of a drive circuit for a speed adjustable fan in accordance with the present invention.

Referring to FIG. 2, a preferred embodiment of the drive circuit for a speed adjustable fan in according to the present invention is illustrated. The drive circuit comprises a computing IC (IC2), a Hall IC (IC1) and a signal input terminal for external signals (PWM) and a current control circuit (10).

A protective diode (D) is connected to the power source and connected to a Zener diode (ZD) through a resistor (R2) for serving as a stabilizer.

Said computing IC (IC2) is connected to the Hall IC. The $7^{th}$ pin of the computing IC (IC2) connects with the power source. The first pin is connected to the base pole of a transistor (Q1) through a resistor (R9). The collector of said transistor (Q1) is connected to a coil (V1) in the fan. The emitter of the transistor (Q1) is connected to the third pin through a resistor (R8) then connected to the emitter of a transistor (Q2). The collector of said transistor (Q2) is connected to another fan coil (V2)of the fan. The computing IC (1C2) controls the two transistors (Q1, Q2) connecting therewith in a state of connecting and in a state of disconnecting sequentially and the two coils (V1, V2) can be magnetized alternately so as to rotate the fan.

The power source terminal of said Hall IC (IC1) is connected to the seventh pin of the computing IC (IC2), and connected to the $8^{th}$, $1^{st}$ and $3^{rd}$ pins of the computing IC (IC2) through the resistors (R1, R3, R4) respectively. The output terminal of the Hall IC is connected to the eighth pin of the computing IC.

Figure 3:
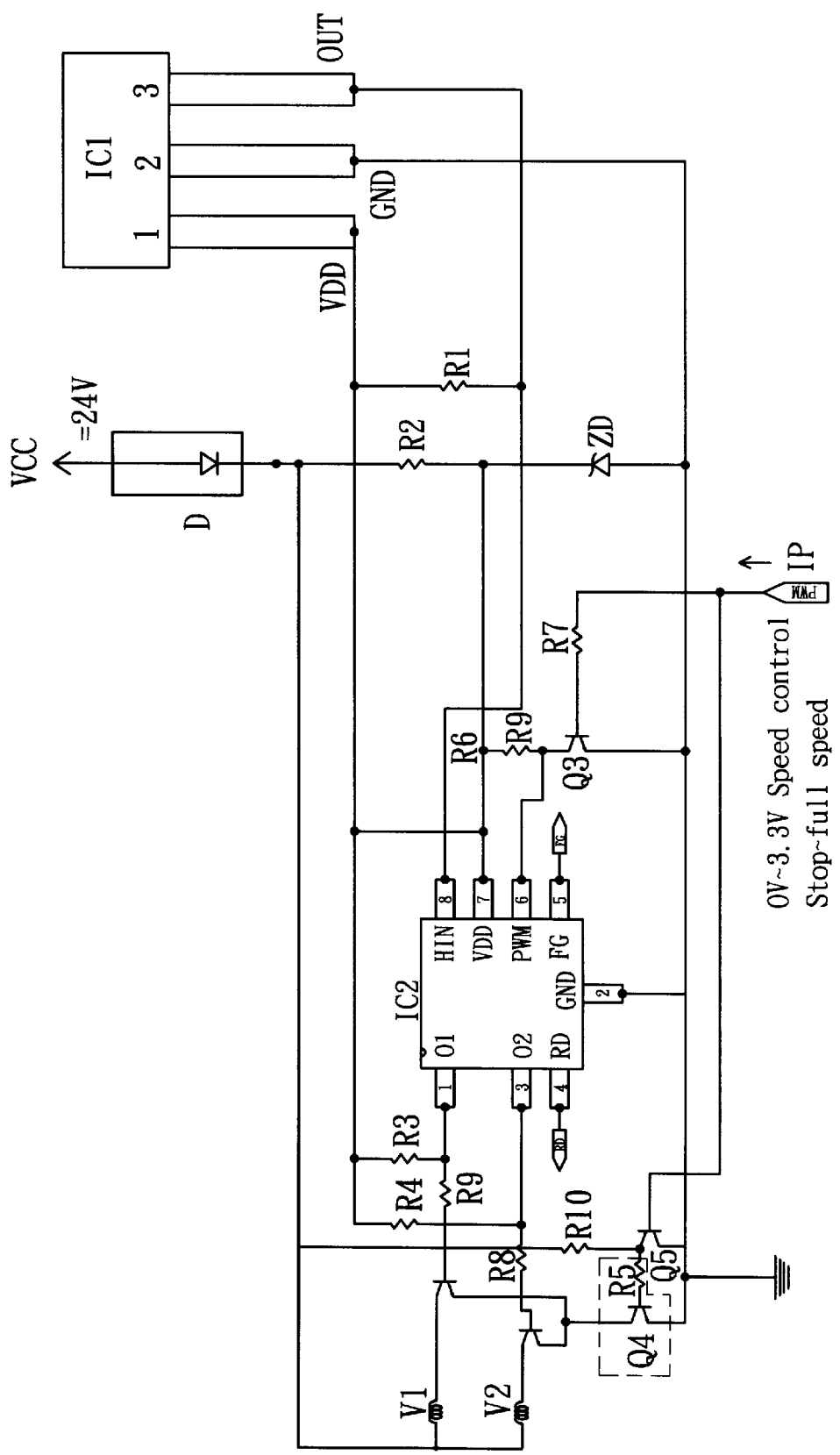
FIG. 3 is a circuit diagram similar to FIG. 2 illustrating another preferred embodiment of the present invention.

The input terminal for the external signals (PWM) serves to detect the external signal sources. The input terminal (PWM) is connected to the current control circuit (10)and connected to the base pole of a transistor (Q3) through a resistor (R7) respectively. The collector of the transistor (Q3) is connected to the computing IC (IC2). The input terminal (PWM) is connected to the current control circuit (10), that is, the input terminal (PWM) is connected to a NPN transistor (Q4) through a resistor (R5). The collector of the transistor (Q4) is connected to both emitters of the two transistors (Q1, Q2) that are in connection with the first and third pins of the computing IC (IC2). As shown in FIG. 3, the input terminal (PWM) is connected to a PNP transistor (Q5) instead of the NPN transistor (Q4). The emitter of the transistor (Q5) is connected to the power source through a resistor (R10) and to the base pole of the transistor (Q4) through a resistor (P5) such that the power consumption of signal source (IP)can be reduced to save the required electricity from the power source.

The current control circuit (10) is composed of the transistor (Q4) and the resistor (R5). The collector in the transistor (Q4) is connected to both emitters of the transistors (Q1, Q2) respectively. The base pole in the tr (Q5) is connected to the input terminal (PWM) such that the voltage at the input terminal (PWM) can be adjusted. Then, the current passing through the current control circuit (10) can be regulated. Therefore, the current entering the coils of the fan is varied so as to control the speed of the fan.

Figure 4:
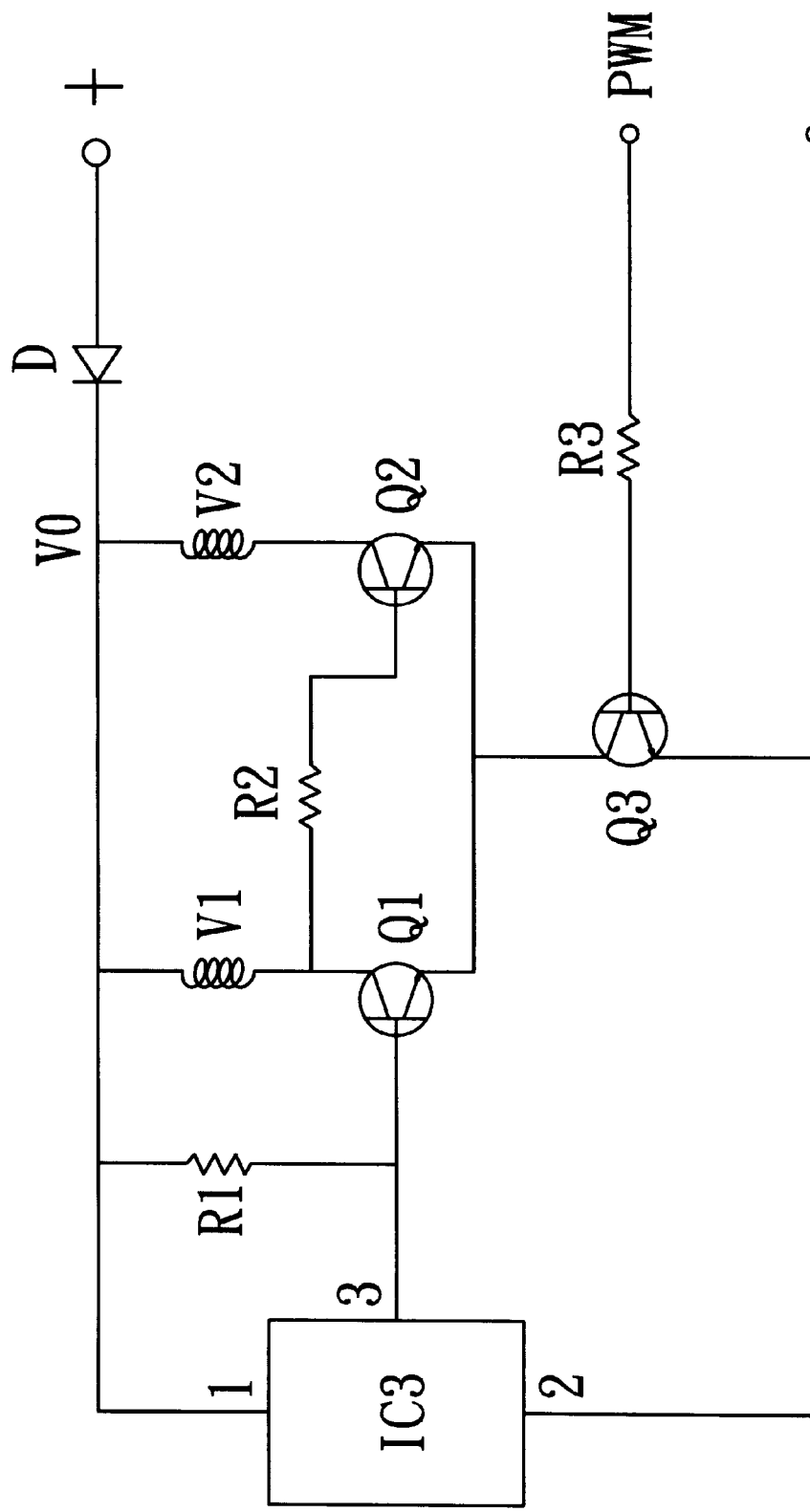
FIG. 4 is a circuit diagram illustrating a further preferred embodiment.

As shown in FIG. 4, another preferred embodiment of the circuit is illustrated. The Hall IC (IC3) sequentially adjusts the connection between the transistor (Q1) and the transistor (Q2) in a state of "open" or "close" to alternately magnetize the two coils (V1, V2) so as to rotate the fan. Both emitters in the two transistors (Q1, Q2) are respectively connected to the collector in the transistor (Q3). By regulating the voltage at the input terminal (PWM), the current passing through the transistor (Q3) and the resistor (R3) can be adjusted so that the speed of the fan can be changed.

It is noted that the above description of preferred embodiments of the present invention regarding a drive circuit for a speed adjustable fan is merely an explanatory example. It can be realized that the drive circuit according to the present invention discloses the rotation speed of a fan can be adjusted by way of internal control instead of an external circuit.

While the invention has been described with reference to preferred embodiments thereof, it is to be understood that modifications or variations may be easily made without departing from the spirit of this invention, which is defined by the appended claims.

What is claimed is:

1. A drive circuit for a speed adjustable fan, comprising:
   a computing integrated circuit (IC2) with a plurality or connecting pins;
   a Hall integrated circuit (IC1), being connected to the computing integrated circuit (IC2);
   a signal input terminal of pulse width modulation (PWM), being connected to the computing integrated circuit (IC2);
   a control circuit (10), being connected to the signal input terminal and being composed of a NPN transistor (Q4) and a resistor (R5);
   a first coil (V1), being connected to the computing integrated circuit (IC2) via a first transistor (Q1);
   a second coil (V2), being connecting to the computing integrated circuit (IC2) via a second transistor (Q2);
   characterized in that the signal input terminal is connected to the computing integrated circuit (IC2) via a third transistor (Q3) and a resistor (R7) such that a base pole of the third transistor (Q3) connecting with the signal input terminal through the resistor (R7), a collector of the third transistor (Q3) is connected to the computing IC (IC2).

2. The drive circuit for a speed adjustable fan as defined in claim 1, wherein the signal input terminal is connected to the control circuit via a PNP transistor (Q5) such that an emitter of the PNP transistor (Q5) is connected to a power source through a resistor (R10) and to a base pole of the NPN transistor (Q4) through the resistor (R5).

3. A drive circuit for a speed adjustable fan, comprising:
   a Hall integrated circuit (IC3);
   a first coil (V1), being connected to the Hall intergrated circuit;
   a second coil (V2), being connected to the Hall integrated circuit too;
   a signal input terminal of pulse width modulation (PWM), being connected to the first coil (V1) and the second coil (V2) via a first transistor (Q1) and a second transistor (Q2) respectively;
   characterized in that a third transistor (Q3 in FIG. 4)) provides a base pole thereof being connected to the signal input terminal through a resistor (R3 in FIG. 4), a collector thereof being connected to an emitter of the first transistor (Q1) and an emitter of the second transistor (Q2) respectively.

* * * * *